(12) United States Patent
Pinsky et al.

(10) Patent No.: US 11,852,444 B1
(45) Date of Patent: *Dec. 26, 2023

(54) PERSONAL ARMOR RESISTANT TO POINTED OR SHARP WEAPONRY

(71) Applicant: The United States of America, as represented by the Secretary of the Navy, Arlington, VA (US)

(72) Inventors: James Gregory Pinsky, Remington, VA (US); Philip J. Dudt, North Bethesda, MD (US); Devin P. Murphy, Sterling, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,477

(22) Filed: Aug. 1, 2019

Related U.S. Application Data

(60) Provisional application No. 62/802,992, filed on Feb. 8, 2019.

(51) Int. Cl.
*F41H 1/02* (2006.01)
*A41D 31/24* (2019.01)
*B32B 5/02* (2006.01)

(52) U.S. Cl.
CPC .............. *F41H 1/02* (2013.01); *A41D 31/24* (2019.02); *B32B 5/022* (2013.01)

(58) Field of Classification Search
CPC .......... B32B 2571/02; B32B 2307/558; B32B 2260/046; B32B 2262/0269; B32B 5/024;
(Continued)

(56) References Cited

U.S. PATENT DOCUMENTS

| 4,179,979 A | 12/1979 | Cook et al. |
| 4,916,000 A * | 4/1990 | Li .......................... A42B 3/062 428/105 |

(Continued)

OTHER PUBLICATIONS

U.S. Appl. No. 16/529,432, filed Aug. 1, 2019, entitled "Personal Armor Resistant to Sharp or Pointed Weaponry," joint inventors James Pinsky, Philip J. Dudt, and Devin P. Murphy.

(Continued)

*Primary Examiner* — Lynda Salvatore
(74) *Attorney, Agent, or Firm* — Howard Kaiser

(57) ABSTRACT

According to exemplary inventive practice, a personal armor system includes a textile-based layer not exceeding ½-half-inch thickness, and an elastomeric coating not exceeding ⅛-inch thickness. The textile-based layer includes a fiber reinforcement and a resin binder. The combined areal density of the textile-based layer and the elastomeric coating does not exceed 2.5 psf. According to a first mode of inventive practice, the elastomeric coating is essentially a strain-rate-sensitivity-hardening elastomer, and the areal density of the textile-based layer does not exceed 2.3 psf. According to a second mode of inventive practice, the elastomeric coating is essentially a microparticle-filled strain-rate-sensitivity-hardening elastomeric matrix material, and the areal density of the textile-based layer does not exceed 1.7 psf. The microparticles (e.g., spherical glass microparticles) do not exceed, by weight, 30 percent of the strain-rate-sensitivity-hardening elastomeric matrix material. The textile-based layer affords ballistic protection; the elastomeric coating affords protection against sharp/pointed objects.

14 Claims, 11 Drawing Sheets

(58) Field of Classification Search
CPC .......... B32B 2250/02; B32B 2260/021; B32B 27/34; B32B 27/40; B32B 2255/10; B32B 2255/20; B32B 2255/26; B32B 2307/718; B32B 5/022; B32B 9/045; B32B 17/1077; B32B 17/10779; B32B 2264/0214; B32B 2264/101; F41H 5/0485; F41H 5/0492; F41H 5/013; F41H 5/0478; F41H 1/02; F41H 5/04; F41H 5/0471; F41H 5/08; F41H 5/0428; F41H 5/0457; F41H 5/0407; F41H 5/0421; F41H 5/0435; F41H 5/0442; F41H 5/045; F41H 5/24; F41H 7/04; F41H 13/00; F41H 1/08; F41H 5/007; F41H 5/02; F41H 5/023; F41H 5/0464; F41H 5/06; F41H 5/226; F41H 7/00; A41D 13/0518; A41D 1/04; A41D 31/24; A41D 13/05; A41D 13/0587; A41D 15/04; A41D 1/002; A41D 31/245
USPC .... 442/134, 135, 164, 168; 89/36.02, 36.05; 2/2.5

See application file for complete search history.

(56) References Cited

U.S. PATENT DOCUMENTS

| | | | |
|---|---|---|---|
| 5,310,819 | A | 5/1994 | Roland et al. |
| 6,386,131 | B1 | 5/2002 | Barsoum |
| 6,941,888 | B2 | 9/2005 | Barsoum |
| 7,114,764 | B1 | 10/2006 | Barsoum et al. |
| 7,226,878 | B2 | 6/2007 | Wagner et al. |
| 7,288,493 | B2 | 10/2007 | Bhatnagar et al. |
| 7,300,893 | B2 | 11/2007 | Barsoum et al. |
| 7,498,276 | B2 | 3/2009 | Wagner et al. |
| 7,685,922 | B1 | 3/2010 | Martin et al. |
| 7,727,914 | B2 | 6/2010 | Chiou |
| 7,794,808 | B2 | 9/2010 | Dudt et al. |
| 7,825,045 | B1 | 11/2010 | Wagner et al. |
| 7,938,053 | B1 | 5/2011 | Dudt et al. |
| 7,946,211 | B1 | 5/2011 | Winchester et al. |
| 8,071,206 | B1 | 12/2011 | Chang et al. |
| 8,096,224 | B2 | 1/2012 | Martin et al. |
| 8,105,510 | B1 | 1/2012 | Martin et al. |
| 8,105,967 | B1 | 1/2012 | Martin |
| 8,220,378 | B2 | 7/2012 | Gamache et al. |
| 8,226,873 | B1 | 7/2012 | Martin et al. |
| 8,236,711 | B1 | 8/2012 | Wang |
| 8,387,510 | B1 | 3/2013 | Martin et al. |
| 8,580,387 | B1 | 11/2013 | Fedderly et al. |
| 8,746,122 | B1 | 6/2014 | Roland et al. |
| 8,789,454 | B1 | 7/2014 | Roland et al. |
| 9,038,332 | B1 | 5/2015 | Littlestone et al. |
| 9,207,048 | B1 | 12/2015 | Roland et al. |
| 9,285,191 | B2 | 3/2016 | Roland et al. |
| 9,291,433 | B2 | 3/2016 | Compton et al. |
| 9,297,617 | B2 | 3/2016 | Roland et al. |
| 9,400,146 | B1 | 7/2016 | Roland et al. |
| 9,416,011 | B2 | 8/2016 | Barsoum et al. |
| 9,835,416 | B1 | 12/2017 | Roland et al. |
| 9,869,533 | B2 | 1/2018 | Vanarsdalen et al. |
| 9,909,843 | B1 | 3/2018 | Gamache et al. |
| RE46,898 | E | 6/2018 | Roland et al. |
| 10,161,721 | B2 | 12/2018 | Roland et al. |
| 10,197,363 | B1 | 2/2019 | Gamache et al. |
| 11,009,318 | B2 | 5/2021 | Roland et al. |
| 11,066,765 | B2 | 7/2021 | Ardiff et al. |
| 11,560,685 | B1 | 1/2023 | Dudt et al. |
| 11,585,639 | B1 | 2/2023 | Pinsky et al. |
| 2007/0093158 | A1 | 4/2007 | Dudt et al. |
| 2013/0213208 | A1 | 8/2013 | Compton et al. |
| 2014/0065907 | A1* | 3/2014 | Oktem ................... D06N 3/106 28/169 |
| 2015/0377592 | A1 | 12/2015 | Roland et al. |

OTHER PUBLICATIONS

U.S. Appl. No. 62/802,992, filed Feb. 8, 2019, hereby incorporated herein by reference, entitled "Personal Armor Resistant to Sharp or Pointed Weaponry," joint inventors James Pinsky, Philip J. Dudt, and Devin P. Murphy.

Paul V. Cavallaro, "Soft Body Armor: An Overview of Materials, Manufacturing, Testing, and Ballistic Impact Dynamics," Naval Undersea Warfare Center Division, Newport, Rhode Island, NUWC-NPT Technical Report 12,057, Aug. 1, 2011 (Approved for public release; distribution is unlimited) (34 pages).

Jennifer S. Spatola, "Failure analysis of high performance ballistic fibers," a Thesis Submitted to the Faculty of Purdue University by Jennifer S. Spatola in Partial Fulfillment of the Requirements for the Degree of Master of Science in Materials Science Engineering, May 2015, Purdue e-Pubs, Purdue University Libraries, Open Access Theses, Theses and Dissertations, Spring 2015, Purdue University, West Lafayette, Indiana (114 pages).

Jared Keller, "The inside story behind the Pentagon's ill-fated quest for a real-life 'Iron Man' suit," Task & Purpose, May 6, 2020, https://taskandpurpose.com/military-tech/pentagon-powered-armor-iron-man-suit/, printed out Feb. 11, 2021 (8 pages).

Non-final Office action (23 pages total), dated Aug. 31, 2021, U.S. Appl. No. 16/529,432, filed Aug. 1, 2019, Pinsky et al., Navy Case No. 103,820, including: cover page (1 p); Office action summary (1 p); detailed action (6 pp); notice of references cited (1 p); search notes (2 pp); index of claims (1 p); applicant's IDS with examiner consideration indicated (8 pp); East search history (3 pp).

Filing receipt (4 pages), mail-dated Aug. 22, 2019, U.S. Appl. No. 16/529,432, filed Aug. 1, 2019, Pinsky et al.

Amendment (35 pages), filed Jan. 31, 2022 in response to non-final Office action dated Aug. 31, 2021, U.S. Appl. No. 16/529,432, application filing date Aug. 1, 2019, Pinsky et al.

Office communication (2 pages total), dated May 2, 2022, U.S. Appl. No. 16/529,432, filed Aug. 1, 2019, Pinsky et al., including cover page (1 p) and applicant-initiated interview summary (1 p).

Non-final Office action (25 pages total), dated Aug. 31, 2021, U.S. Appl. No. 16/529,432, filed Aug. 1, 2019, Pinsky et al., including: cover page (1 p); Office action summary (1 p); detailed action (8 pp); notice of references cited (1 p); index of claims (1 p); search notes (2 pp); two applicant's IDS's with examiner consideration indicated (8 pp); East search history (3 pp).

Information disclosure statement (IDS) form (4 pages), filed Feb. 13, 2022, U.S. Appl. No. 16/529,432, filed Aug. 1, 2019, Pinsky et al.

[Corrected Citation—Document was submitted on Jul. 17, 2022 as NPL.] Final Office action (25 pages total), dated May 2, 2022, U.S. Appl. No. 16/529,432, filed Aug. 1, 2019, Pinksy et al., including: cover page (1 p); Office action summary (1 p); detailed action (8 pp); notice of reference cited (1 p); index of claims (1 p); search notes (2 pp); two applicant's IDS's with examiner consideration indicated (8 pp); East search history (3 pp).

Issue notification (1 page), dated Feb. 1, 2023, U.S. Appl. No. 16/529,432, filed Aug. 1, 2019, Pinsky et al., now U.S. Pat. No. 11,585,639.

Amendment after final rejection (22 pages), filed Aug. 16, 2022, U.S. Appl. No. 16/529,432, filed Aug. 1, 2019, Pinsky et al., now U.S. Pat. No. 11,585,639.

Amendment accompanying RCE (28 pages), filed Jul. 17, 2022, U.S. Appl. No. 16/529,432, filed Aug. 1, 2019, Pinsky et al., now U.S. Pat. No. 11,585,639.

Notice of allowance and fee(s) due (34 pages, including notice of allowability along with attachments), dated Sep. 19, 2023, U.S. Appl. No. 16/529,432, filed Aug. 1, 2019, Pinsky et al., now U.S. Pat. No. 11,585,639.

Amendment after notice of allowance (4 pages and 1 drawing sheet), filed Nov. 9, 2019, U.S. Appl. No. 16/529,432, filed Aug. 1, 2019, Pinsky et al., now U.S. Pat. No. 11,585,639.\

(56) References Cited

OTHER PUBLICATIONS

Electronic terminal disclaimer (filed on Sep. 6, 2022)—approved, U.S. Appl. No. 16/529,432, filed Aug. 1, 2019, Pinsky et al., now U.S. Pat. No. 11,585,639.

* cited by examiner

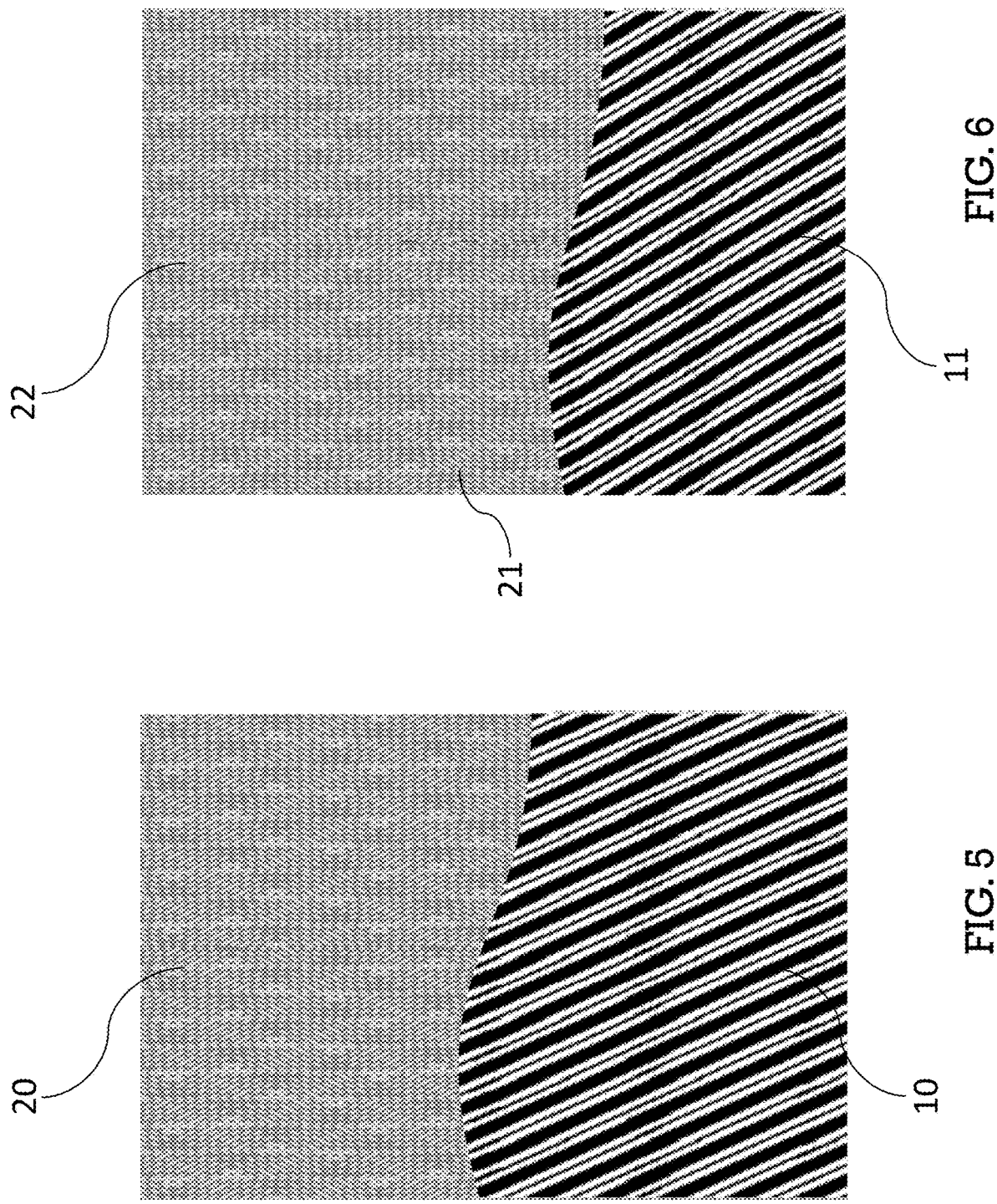

THICKNESS RATIOS FOR VARIOUS COMBINATIONS OF
ELASTOMERIC COATING THICKNESS AND TEXTILE LAYER THICKNESS

|  | 0.2" thick textile layer | 0.3" thick textile layer | 0.4" thick textile layer | 0.5" thick textile layer |
|---|---|---|---|---|
| 0.06" thick elastomeric coating | 0.3 | 0.2 | 0.15 | 0.12 |
| 0.08" thick elastomeric coating | 0.4 | 0.27 | 0.2 | 0.16 |
| 0.1" thick elastomeric coating | 0.5 | 0.33 | 0.25 | 0.2 |
| 0.12" thick elastomeric coating | 0.6 | 0.4 | 0.3 | 0.24 |

FIG. 17

ELASTOMERIC COATING THICKNESS RANGE AND TEXTILE LAYER AERIAL DENSITY RANGE
IN ACCORDANCE WITH ELASTOMERIC COATING TYPE

| Elastomeric Coating Type | Elastomeric Coating Thickness Range | Textile Layer Aerial Density Range |
|---|---|---|
| Strain-Rate-Sensitivity-Hardening Elastomer Coating | 0.08 – 0.10 in | 1.8 – 2.3 psf |
| Particle-Filled Strain-Rate-Sensitivity-Hardening Elastomeric Matrix Material Coating | 0.08 – 0.10 in | 1.3 – 1.7 psf |

FIG. 18

PERSONAL ARMOR RESISTANT TO POINTED OR SHARP WEAPONRY

CROSS-REFERENCE TO RELATED APPLICATIONS

This application claims the benefit of U.S. provisional application No. 62/802,992, filed 8 Feb. 2019, hereby incorporated herein by reference, entitled "Personal Armor Resistant to Sharp or Pointed Weaponry," joint inventors James Pinsky, Philip J. Dudt, and Devin P. Murphy.

This application is related to U.S. nonprovisional application entitled "Personal Armor Resistant to Sharp or Pointed Weaponry," being filed concurrently herewith and hereby incorporated herein by reference, joint inventors James Pinsky, Philip J. Dudt, and Devin P. Murphy, Navy Case Number 103,820.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to armor, more particularly to personal armor (e.g., body armor and helmets) that protects against penetration by sharp or pointed objects such as stabbing instruments (e.g., knives and bayonets) and some types of projectiles (e.g., arrows and flechettes).

Ballistic fabrics are notable among the materials that are commonly used in conventional protective armors. Ballistic fabrics typically have a woven or laminate construction and are made of advanced synthetic fibrous/textile materials such as Kevlar®, Twaron®, Spectra®, Dyneema®, and Zylon®. Examples of high-performance ballistic fibers are aramid, polyethylene, polyamide, polyester, polybenzobisoxazole, and glass. A lightweight ballistic fabric can defeat a projectile by "catching" it through large levels of extension. Ballistic fabrics are used, for instance, in helmets and lightweight body armor (e.g., vests) and for protecting ship spaces. In addition, low weight protective shields have been made for protection in complex environments.

Also commonly used in conventional protective armors are ceramic materials. A ceramic plate or insert operates by breaking up a projectile with a hard surface. Typically, a spall composite layer is provided behind the comminuted ceramic to catch the projectile fragments and ceramic particles.

Many ballistic fabrics are vulnerable in their susceptibility to penetration (e.g., cut, slash, slice, stab, or puncture) by knives, blades, swords, bayonets, arrows, flechettes, ice picks, spikes, awls, needles, sharp/pointed explosive fragments, and other sharp or pointed objects. For instance, police and special ops are vulnerable to attack by hunting arrows that are razor sharp and can cut through even the strongest Kevlar®; this threat is especially prevalent in jungles and other densely forested areas. Hand-held items such as knives, ice picks, "shivs," etc., pose threats in prison and other dangerous environments.

It is generally understood in the personal armor-related arts that an armor system designed to protect against a particular threat may not be effective against another type of threat. For instance, woven fabrics that are designed to afford ballistic protection differ from woven fabrics that are designed to afford stab resistance. See, e.g., Paul V. Cavallaro, "Soft Body Armor: An Overview of Materials, Manufacturing, Testing, and Ballistic Impact Dynamics," Naval Undersea Warfare Center Division, Newport, Rhode Island, NUWC-NPT Technical Report 12,057, 1 Aug. 2011 (Approved for public release; distribution is unlimited), incorporated herein by reference.

Generally speaking, textiles for ballistic protection are less densely (more loosely) woven in order that there be sufficient mobility of the yarns to prevent premature failure upon impact of the projectile. On the other hand, textiles for stab resistance are more densely (more tightly) woven in order that the yarns not be pushed aside upon impingement by the sharp or pointy object. It is thus seen that, with respect to ballistic protection vis-A-vis stab resistance, the design criteria for personal armor are incongruous. Ballistic textile will tend to perform unsatisfactorily for stab resistance, and stab-resistant textile will tend to perform unsatisfactorily for ballistic protection. Similarly, commercially available nonwoven laminates having unidirectional fibers, such as Dyneema® or Spectra Shield®, are optimized for ballistic protection but will be lacking in performance against sharp or pointed objects.

In a variety of contexts, the dual threats exist of (i) ballistic penetration and (ii) sharp-pointed or sharp-edged penetration. Personal armor systems are typically designed to protect against either shooting or stabbing, but not against both kinds of threats. For instance, an armor system devised to protect against bullets may not afford sufficient protection against knives and the like. Multi-threat personal armors have been conceived that are designed to protect against various types of threats. Solutions have been proposed that integrate ballistic protective armor with cutting/stabbing protective armor.

A notable approach to multi-threat protection is disclosed by Norman J. Wagner and Eric D. Wetzel in the following U.S. patents, each of which is hereby incorporated herein by reference: U.S. Pat. No. 7,226,878 B2, entitled "Advanced Body Armor Utilizing Shear Thickening Fluids"; U.S. Pat. No. 7,498,276 B2, entitled "Advanced Body Armor Utilizing Shear Thickening Fluids"; U.S. Pat. No. 7,825,045 B1, entitled "Advanced Body Armor". Wagner et al. disclose a kind of "liquid armor" technology. According to Wagner et al., a "shear thickening fluid" includes a carrier (e.g., ethylene glycol) with particles suspended in the liquid carrier. A ballistic fabric is infused with and holds the shear thickening fluid. While held within the fabric, the shear thickening fluid stiffens when impacted by a sharp/pointed object, thereby defeating the impacting object.

Among the drawbacks of Wagner et al.'s methodology is the likelihood that the shear thickening fluid will degrade over time if not safeguarded from the atmosphere. Furthermore, the shear thickening fluid is effective over a limited range of penetrator velocities and cannot address all of the threats. The liquid armor technology spawned by Wagner et al. has been considered and tested by the U.S. military for implementation in various suits of armor, such as "iron man" exoskeleton suits and tactical assault light operator suits.

SUMMARY OF THE INVENTION

In view of the foregoing, an object of the present invention is to provide an armor that defeats both (i) ballistic impacts and (ii) sharp-edged or sharp-pointed impacts.

An exemplary embodiment of an inventive composite armor system includes a ballistic fabric-based component and an elastomeric material. The ballistic fabric-based component is characterized by an aerial areal density no greater than approximately 2.3 pounds per square foot. The elastomeric material consists essentially of a strain-rate-sensitivity-hardening elastomer, and covers at least one area of the ballistic fabric-based component. In the at least one area of the ballistic fabric-based component, the elastomeric material and the ballistic fabric-based component, in combination, are characterized by an aerial areal density no greater than approximately 2.5 pounds per square foot.

Another exemplary embodiment of an inventive composite armor system includes a ballistic fabric-based component and an elastomeric material. The ballistic fabric-based component is characterized by an aerial areal density no greater than approximately 1.7 pounds per square foot. The elastomeric material consists essentially of a particle-filled strain-rate-sensitivity-hardening elastomeric matrix material, and covers at least one area of the ballistic fabric-based component. The particle-filled strain-rate-sensitivity-hardening elastomeric matrix material is characterized by a combination of an elastomer matrix and a quantity of particles in the elastomer matrix, wherein the quantity of particles by weight constitutes no greater than approximately 50 percent of the elastomer. In the at least one area of the ballistic fabric-based component, the elastomeric material and the ballistic fabric-based component, in combination, are characterized by an aerial areal density no greater than approximately 2.5 pounds per square foot.

According to an exemplary embodiment of an inventive method for enhancing armor, a personal armor device is provided that includes a ballistic fabric-based component. The ballistic fabric-based component is characterized by an aerial areal density no greater than approximately 2.3 pounds per square foot. At least one area of the ballistic fabric-based component is covered with an elastomeric material, which consists essentially of a strain-rate-sensitivity-hardening elastomer. The covering of the at least one area is performed so that, in the at least one area, the elastomeric material and the ballistic fabric-based component, in combination, are characterized by an aerial areal density no greater than approximately 2.5 pounds per square foot.

According to another exemplary embodiment of an inventive method for enhancing armor, a personal armor device is provided that includes a ballistic fabric-based component. The ballistic fabric-based component is characterized by an aerial areal density no greater than approximately 1.7 pounds per square foot. At least one area of the ballistic fabric-based component is covered with an elastomeric material, which consists essentially of a particle-filled strain-rate-sensitivity-hardening elastomeric matrix material, which is characterized by a combination of an elastomer matrix and a quantity of particles in the elastomer matrix, wherein the quantity of particles, by weight, constitutes no greater than approximately 50 percent of the weight of the elastomer matrix. The covering of the at least one area is performed so that, in the at least one area, the elastomeric material and the ballistic fabric-based component, in combination, are characterized by an aerial areal density no greater than approximately 2.5 pounds per square foot.

According to exemplary inventive practice, a relatively thin coating of a strain-rate-sensitivity-hardening elastomer is provided on a ballistic fabric-based component (e.g., a helmet, vest, or sleeve) in order to enhance the ballistic armor component with an ability to defeat pointed or sharp-cutting projectiles and instruments. The present invention's ballistic fabric-based component is protective against ballistic impacts. In addition, the present invention's elastomeric coating is protective against sharp-pointed or sharp-edged impacts. According to an exemplary inventive body armor, the elastomeric material imparts stab resistance but does not "weigh down" the body armor and does not compromise the ballistic protection of the underlying fabric layer.

Generally speaking, it is desirable for a personal armor to be relatively lightweight in order to be comfortably worn on a person's head or body. A key feature of exemplary inventive practice is the thinness, and hence lightweightness, of the elastomeric coating. The elastomeric coating of an exemplary inventive embodiment is significantly thinner than its ballistic fabric-based component. The elastomeric coating is the face component of an exemplary inventive armor system. The thinness characterizing the inventive armor's elastomeric coating is functionally significant in protecting against various kinds of weaponry. The material, physical, and dimensional qualities of the elastomer serve to afford resistance to sharp/pointed weaponry and garment practicality (particularly in terms of weight, shape, and bulkiness), while permitting ballistic protection by the underlying fabric-based component.

Exemplary inventive embodiments are protective against plural/multiple threats. An inventive armor is resistant to ballistics because of the ballistic fabric-based component, and is resistant to cutting or puncturing by sharp or pointed implements and ammunition because of the elastomeric coating. The present invention defends against projectiles and implements that are penetrative by virtue of their sharp-pointed or sharp-edged configuration. An inventive armor may be efficaciously embodied, for example, as soft body armor (e.g., a vest or sleeve) or a helmet. As exemplarily embodied, an inventive armor represents a practical, low-cost, durable methodology for defeating threats from sharp-edged/pointed hand weapons, or from flechettes and other sharp-edged/pointed weapons traveling at higher velocities.

Unlike conventional armor systems, an exemplary inventive armor system can afford protection over a broad range of velocities. Furthermore, an exemplary inventive device does not require maintenance, resulting in cost savings for SOCOM (U.S. Special Operations Command) and other types of armor suits. Items suitable for application of the inventive technology include but are not limited to helmets, ballistic fabric vest plates (such as containing electronic gear), and equipment cowls and fairings for protecting underlying equipment. The present invention can be embodied to protect a human's torso, limbs, and/or head, or to protect inanimate objects.

Exemplary inventive practice utilizes a strain-rate-sensitivity-hardening elastomer such as disclosed by the following United States patents, each of which is hereby incorporated herein by reference. These references are informative with regard to strain-rate-sensitivity-hardening elastomers and their physical properties: U.S. Pat. No. 9,869,533 B2 to Vanarsdalen et al. entitled "Blast and Ballistic Improvement in Helmets"; U.S. Pat. No. 8,580,387 B1 to Fedderly et al. entitled "Polyurea Composite Armor"; U.S. Pat. No. 7,946,211 B1 to Winchester et al. entitled "Electrical and Elastomeric Disruption of High-Velocity Projectiles"; U.S. Pat. No. 7,938,053 B1 to Dudt et al. entitled "Armor"; U.S. Pat. No. 7,794,808 B2 to Dudt et al. entitled "Elastomeric Damage-Control Barrier"; U.S. Pat. No. 7,300,893 B2 to Barsoum et al. entitled "Armor Including a Strain Rate Hardening Elastomer"; U.S. Pat. No. 7,114,764 B1 to Barsoum et al. entitled "Mine and Collision Protection for Passenger Vehicle". Types of elastomers that may be suitable for inventive practice of a strain-rate-sensitivity-hardening elastomer include polyurea, polyurethane, or a combination (e.g., mixture) of polyurea and polyurethane.

BRIEF DESCRIPTION OF THE DRAWINGS

The present invention will now be described, by way of example, with reference to the accompanying drawings, wherein like numbers indicate same or similar parts or components, and wherein:

FIGS. 1 through 4 are similar cross-sectional views of various embodiments of inventive armor.

FIG. 2 shows an embodiment of inventive armor that includes a strain-rate-sensitivity-hardening elastomer coating (such as a polyurea) and a ballistic fabric (such as a Kevlar® material), wherein a portion of the elastomer coating infiltrates the ballistic fabric.

FIG. 3 shows an embodiment of inventive armor that includes a particle-filled strain-rate-sensitivity-hardening elastomeric matrix material coating (such as a polyurea filled with microparticles, e.g., glass microspheres) and a ballistic fabric (such as a Kevlar® material).

FIG. 4 shows an embodiment of inventive armor that includes a particle-filled strain-rate-sensitivity-hardening elastomeric matrix material coating (such as a polyurea filled with microparticles, e.g., glass microspheres) and a ballistic fabric (such as a Kevlar® material), wherein a portion of the particle-filled strain-rate-sensitivity-hardening elastomeric matrix material coating infiltrates the ballistic fabric.

FIGS. 5 through 8 are cutaway top plan views of the embodiments of inventive armor shown in FIGS. 1 through 4, respectively.

FIGS. 13 and 14 are similar.

FIGS. 15 and 16 are similar.

FIG. 17 is a table setting forth various respective thicknesses of an elastomeric coating and a ballistic fabric, and various corresponding thickness-to-thickness ratios, in accordance with exemplary practice of the present invention.

FIG. 18 is a table setting forth the elastomeric coating thickness ranges and the ballistic fabric aerial areal density ranges for two modes of inventive practice, viz., (i) an inventive armor system including a strain-rate-sensitivity-hardening elastomer coating, and (ii) an inventive armor system including a particle-filled strain-rate-sensitivity-hardening elastomeric matrix material coating.

DESCRIPTION OF EXEMPLARY EMBODIMENTS OF THE INVENTION

Figure 2:
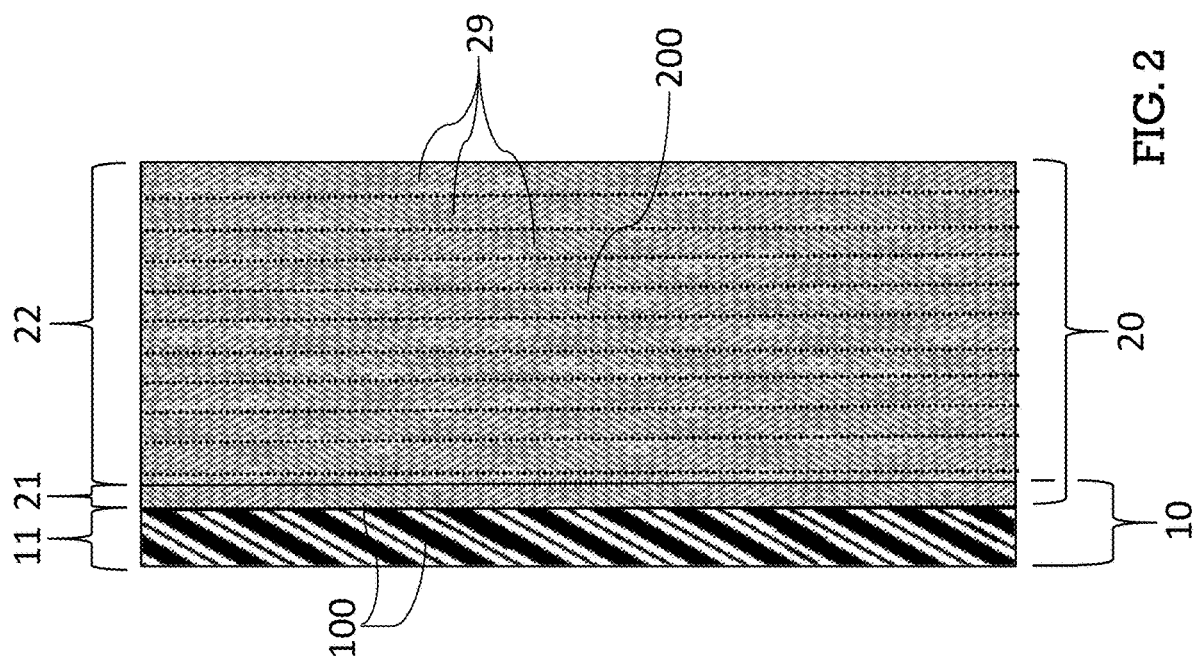

Referring now to FIGS. 1 through 8, according to exemplary practice of the present invention an elastomeric coating forms an integral shell that resists penetration by sharp and pointed objects. Depending on the inventive embodiment, the elastomeric coating can be: either (i) an unfilled strain-rate-sensitivity-hardening elastomer (e.g., polyurea or other polymer) coating 10, such as shown in FIGS. 1, 2, 5, and 6; or (ii) a particle-filled strain-rate-sensitivity-hardening elastomeric (e.g., polyurea or other polymer) matrix coating 30, such as shown in FIGS. 3, 4, 7, and 8.

The elastomer (e.g., polyurea) in elastomeric coating 10 or 30, according to exemplary inventive practice, is a polymer from a class of polymers that exhibit highly rate-sensitive behavior over a wide range of velocities. The physical properties of a polyurea or other polymer that may be suitably used for inventive practice of an elastomeric coating 10 or an elastomeric coating 30 are disclosed in the aforementioned U.S. Pat. Nos. 9,869,533 B2, 8,580,387 B1, 7,946,211 B1, 7,938,053 B1, 7,794,808 B2, 7,300,893 B2, and 7,114,764 B1, each of which is incorporated by reference in the instant disclosure.

As the terms are used herein, (i) a "strain-rate-sensitivity-hardening elastomer coating" and (ii) a "particle-filled strain-rate-sensitivity-hardening elastomeric matrix material coating" are two types of "elastomeric coating" that are used in accordance with exemplary practice of the present invention. Otherwise expressed, (i) a "strain-rate-sensitivity-hardening elastomer" and (ii) a "particle-filled strain-rate-sensitivity-hardening elastomeric matrix material" are two types of "elastomeric material" that is used in accordance with exemplary practice of the present invention. A strain-rate-sensitivity-hardening elastomer coating is unadulterated, i.e., unfilled. According to exemplary inventive practice of a particle-filled strain-rate-sensitivity-hardening elastomeric matrix material coating, the particles are microparticles, for instance, spherical microparticles such as made of a glass material. A particle-filled strain-rate-sensitivity-hardening elastomeric matrix material is a strain-rate-sensitivity-hardening elastomer coating that is filled with particles to a weight that, according to exemplary inventive practice, is 50% or less of the weight of the strain-rate-sensitivity-hardening elastomer material.

For instance, by way of example of inventive practice, a polyurea contains a quantity of particles filled (e.g., spherical glass microparticles) to a weight that is 30% or less of the weight of the polyurea. According to exemplary embodiments of the present invention, a particle-filled strain-rate-sensitivity-hardening elastomeric matrix material represents a combination of a strain-rate-sensitivity-hardening elastomer material and a quantity (e.g., multiplicity) of particles (e.g., microparticles) wherein the quantity of particles has a weight in the approximate range of 10% to 30% of the weight of the strain-rate-sensitivity-hardening elastomer material.

Figure 1:
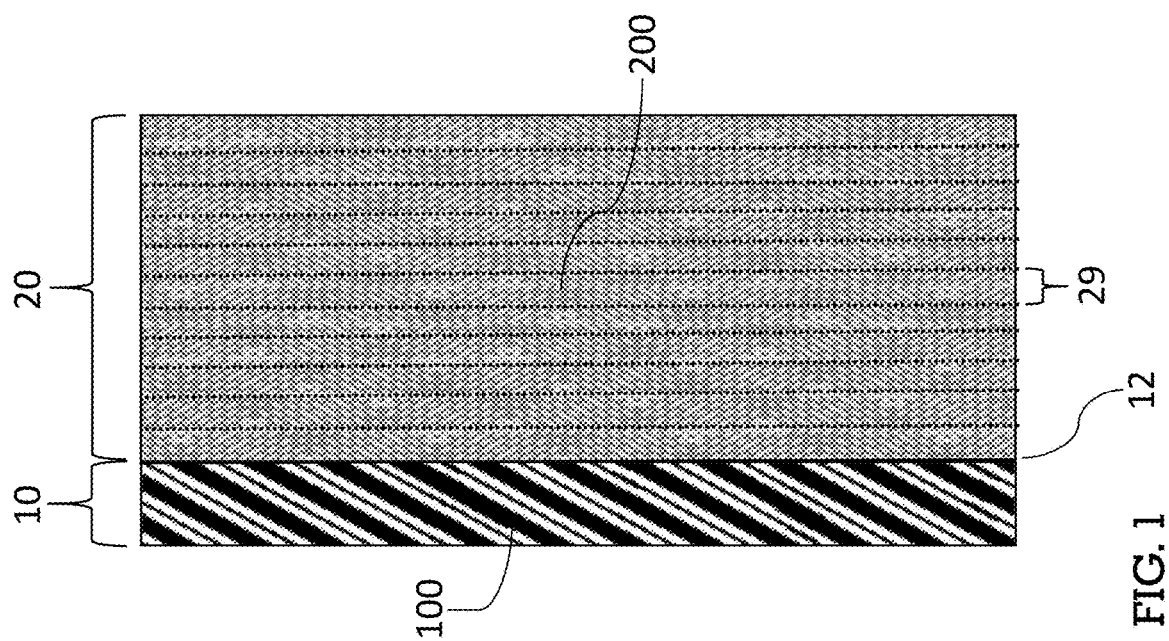
FIG. 1 is a cross-sectional view of an embodiment of inventive armor. The inventive armor includes a strain-rate-sensitivity-hardening elastomer coating (such as a polyurea) and a ballistic fabric (such as a Kevlar® material).

As shown in FIGS. 1 and 5, a relatively thin strain-rate-sensitivity-hardening elastomer (e.g., polyurea) coating layer 10 is bonded onto the top surface of a ballistic-fabric-based component 20 "backing," thereby establishing an interface 12 therebetween in a layered configuration of inventive armor. Strain-rate-sensitivity-hardening elastomer coating 10 at least substantially consists of strain-rate-sensitivity-hardening elastomer material 100, and is thin in comparison with the thickness of ballistic-fabric-based layer component 20. Interface 12 represents a demarcation between elastomeric coating layer 10 and ballistic-fabric-based component 20. FIGS. 1 and 5 thus illustrate an inventive embodiment in which there is a clear delineation (separation) between elastomeric coating layer 10 and ballistic-fabric-based component 20. Examples of commercially available fabrics that may be suitably used for inventive practice of ballistic-fabric-based component 20 include Kevlar®, Twaron®, Spectra®, Dyneema®, Cordura®, and Zylon®.

In contrast to FIGS. 1 and 5, FIGS. 2 and 6 illustrate an inventive embodiment characterized by a degree of infiltration (permeation) of the strain-rate-sensitivity-hardening elastomer coating 10 into the ballistic-fabric-based layer component 20. Accordingly, strain-rate-sensitivity-hardening elastomer coating 10 and ballistic-fabric-based layer component 20 overlap (intersect) to form an infiltration region 21, which represents both a sublayer of strain-rate-sensitivity-hardening elastomer coating 10 and a sublayer of ballistic-fabric-based layer component 20. Infiltration region 21 includes strain-rate-sensitivity-hardening elastomer material 100 and ballistic-fabric-based material 200.

It may be considered that, as shown in FIGS. 2 and 6, strain-rate-sensitivity-hardening elastomer coating 10 includes two adjacent sublayers, viz., an elastomeric sublayer n and an infiltration sublayer 21. Similarly, it may be considered that ballistic-fabric-based layer component 20 includes two adjacent sublayers, viz., a fabric-based sublayer 22 and an infiltration sublayer 21. Infiltration region/sublayer 21 is a combination including elastomeric coating 10 and ballistic-fabric-based component 20; that is, infiltration region/sublayer 21 includes strain-rate-sensitivity-hardening elastomer material 100 and ballistic-fabric-based material 200.

As distinguished from the exemplary inventive embodiments shown in FIGS. 1, 2, 5, and 6, the exemplary inventive embodiments shown in FIGS. 3, 4, 7, and 8 include a particle-filled strain-rate-sensitivity-hardening elastomeric (e.g., polyurea) matrix coating 30 that contains a plethora of microparticles 50, such as glass microspheres. The inventive embodiment of FIGS. 1 and 5 is analogous to the inventive embodiment of FIGS. 3 and 7 insofar as the elastomeric coating does not infiltrate into the ballistic-fabric-based component 20.

Figure 4:
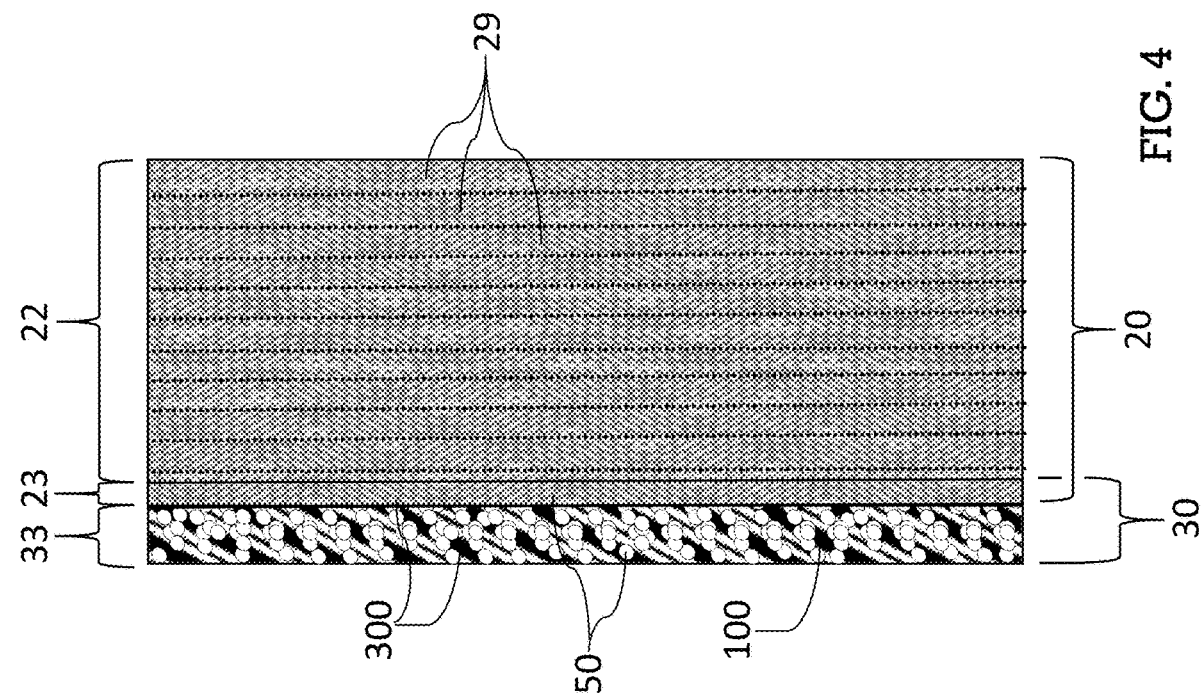
Figure 8:
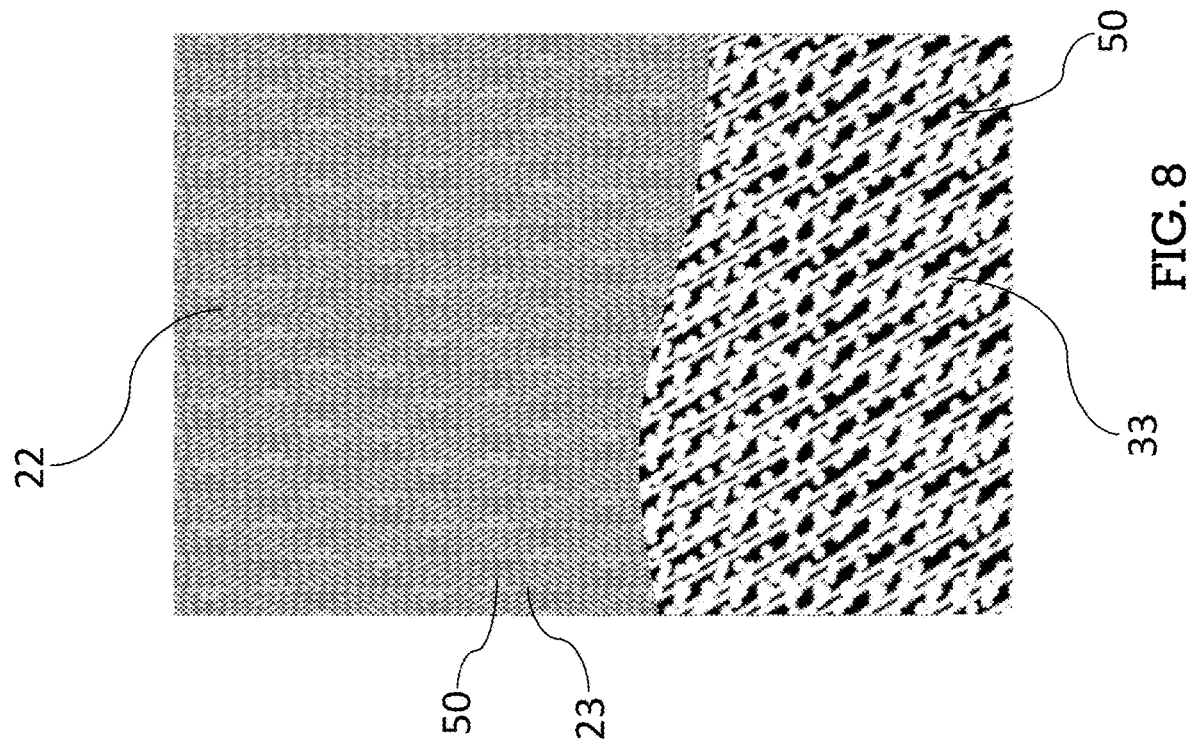

The inventive embodiment of FIGS. 2 and 6 is analogous to the inventive embodiment of FIGS. 4 and 8 insofar as the elastomeric coating infiltrates into the ballistic-fabric-based component 20. Like infiltration region 21 (shown in FIGS. 2 and 6), infiltration region 23 (shown in FIGS. 4 and 8) is filled with plural (e.g., multiple) microspheres 50. Infiltration region 21 includes strain-rate-sensitivity-hardening elastomer material 100 and ballistic-fabric-based material 200; in contrast, infiltration region 23 includes particle-filled strain-rate-sensitivity-hardening elastomeric matrix material 300 and ballistic-fabric-based material 200.

Figure 3:
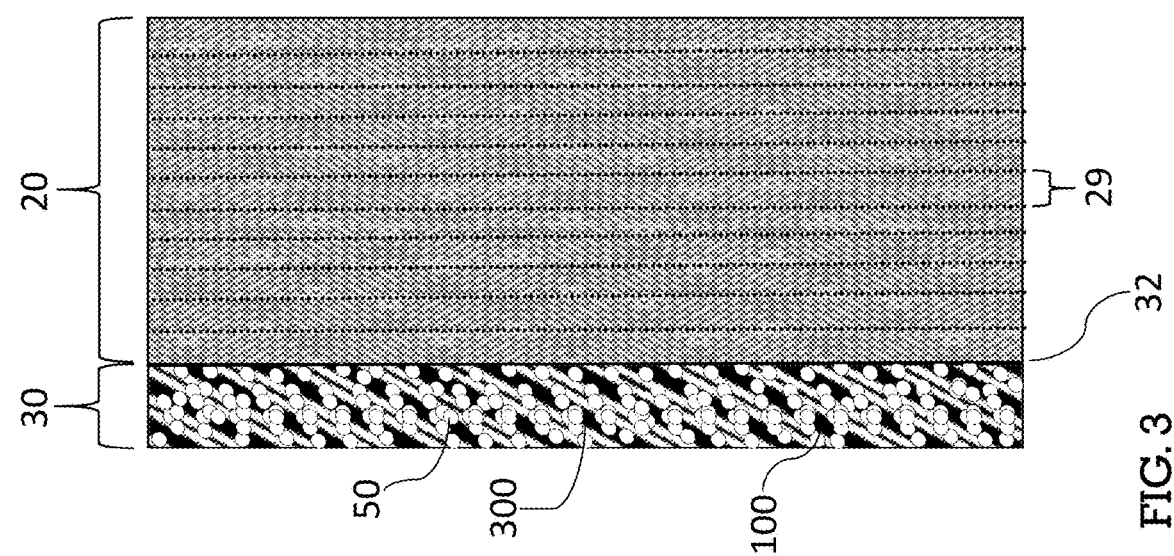
Figure 7:
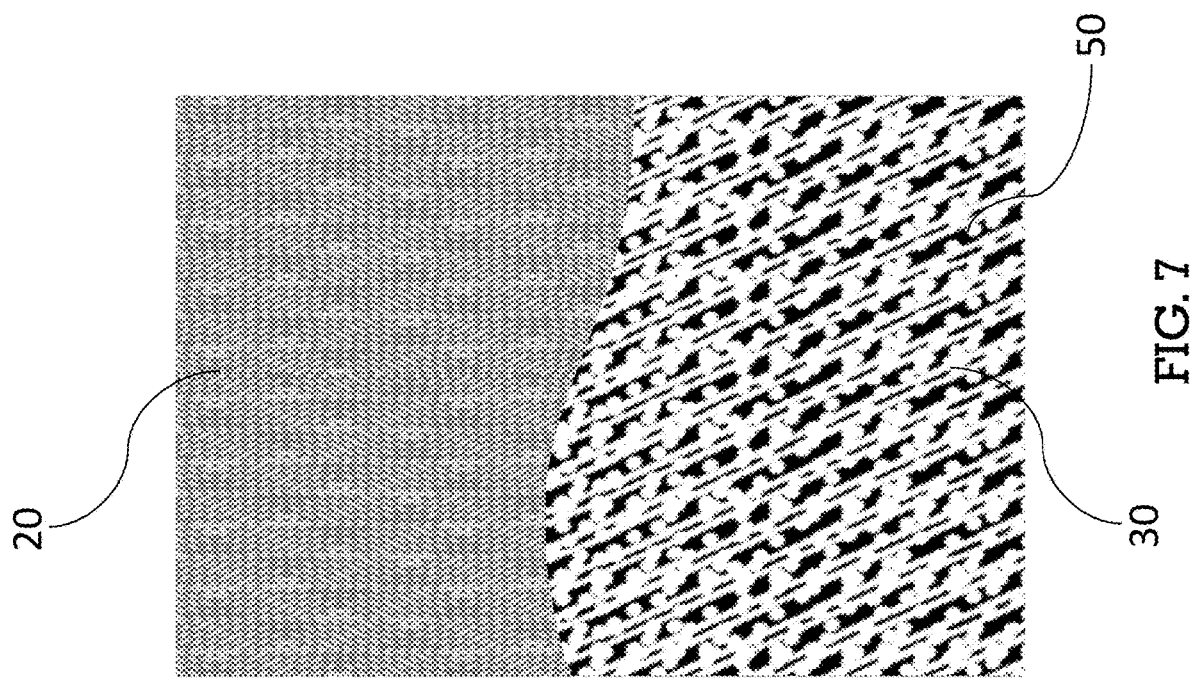
Figure 11:
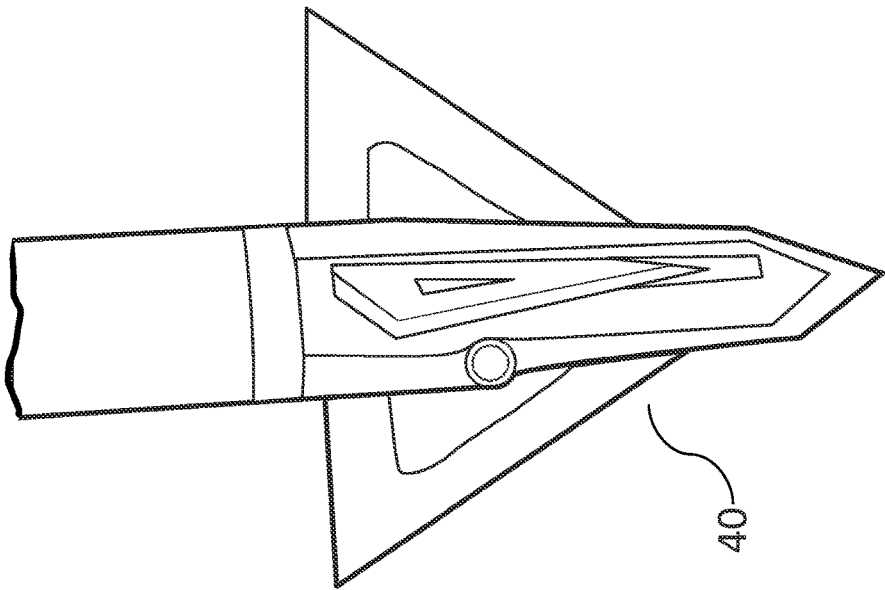
FIGS. 9 through 11 are representations, based on photographic images, of three broadhead arrows that were used by the present inventors in their testing of the present invention.
Figure 10:
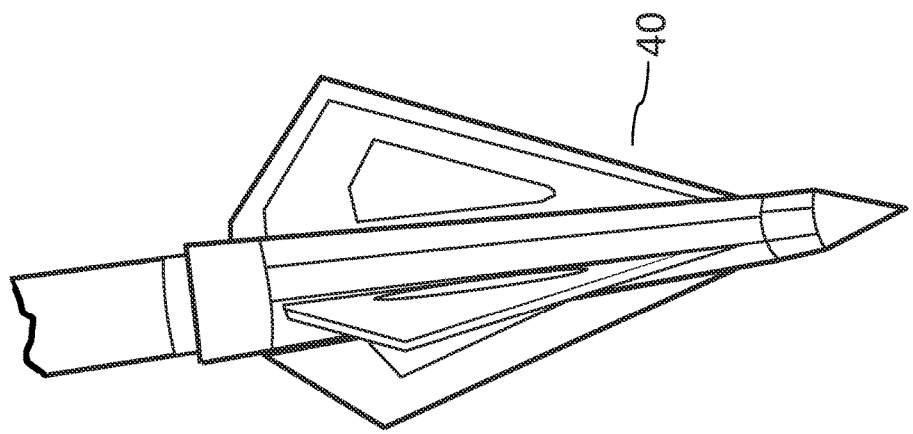
Figure 9:
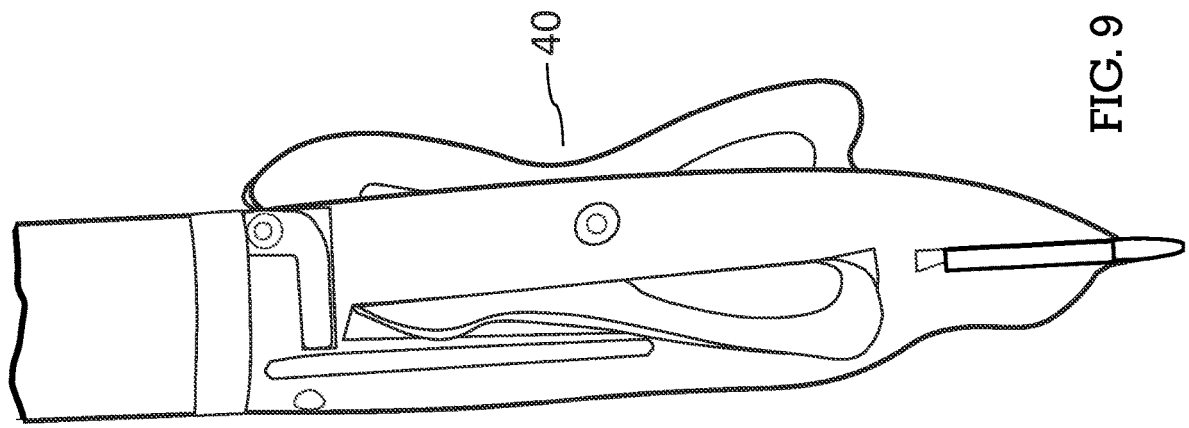

As shown in FIGS. 3 and 7, particle-filled elastomeric (e.g., polyurea) matrix coating layer 30 is bonded onto the top surface of ballistic-fabric-based component 20 "backing," thereby establishing an interface 32 therebetween in a layered configuration of inventive armor. The particle-filled elastomeric matrix coating layer 30 is thin in comparison with the thickness of ballistic-fabric-based layer component 20. Interface 32 represents a demarcation between elastomeric coating layer 30 and ballistic-fabric-based component 20. FIGS. 3 and 7 thus illustrate an inventive embodiment in which there is a clear delineation (separation) between elastomeric coating layer 30 and ballistic-fabric-based component 20.

FIGS. 4 and 8 illustrate an inventive embodiment characterized by a degree of infiltration (permeation) of the particle-filled elastomeric matrix coating 30 into the ballistic-fabric-based layer component 20. Particle-filled strain-rate-sensitivity-hardening elastomeric (e.g., polyurea) matrix coating 30 and ballistic-fabric-based layer component 20 overlap (intersect) to form an infiltration region 23, which represents both a sublayer of particle-filled strain-rate-sensitivity-hardening elastomeric matrix coating layer 30 and a sublayer of ballistic-fabric-based layer component 20.

The ordinarily skilled artisan who reads the instant disclosure will appreciate that an elastomeric coating material 10/30 does not need to be directly infused into the underlying fabric material 20 in order to be infiltrative into fabric material 20. Rather, a relatively small quantity of elastomeric coating material 10/30 may infiltrate fabric material 20 when the elastomeric coating material 10/30 is exteriorly coupled (e.g., bonded) with fabric material 20.

It may be considered that particle-filled strain-rate-sensitivity-hardening elastomeric matrix coating 30 includes two adjacent sublayers, viz., an elastomeric sublayer 33 and an infiltration sublayer 23. Similarly, it may be considered that ballistic-fabric-based layer component 20 includes two adjacent sublayers, viz., a fabric-based sublayer 22 and an infiltration sublayer 23. Infiltration region/sublayer 23 is a combination including elastomeric coating 30 and ballistic-fabric-based component 20; that is, infiltration region/sublayer 23 includes particle-filled strain-rate-sensitive elastomeric matrix material 300 strain-rate-sensitivity-hardening elastomer material 100 and ballistic-fabric-based material 200.

FIGS. 1 through 4 each illustrate a laminar construction of the ballistic-fabric-based component 20, characterized by eleven plies 29. Ballistic-fabric-based material 200 is, for instance, a fiber-reinforced, resin-bound material. Many conventional helmets and other protective gear are fiber-reinforced polymer matrix composites (PMCs) containing a high volume fraction of fibers (e.g., fabrics). A conventional ballistic protective helmet is typically characterized by a low polymeric (e.g., resin) matrix content and a fibrous configuration, somewhat akin to that of an upside-down bird's nest, wherein the fibers act to "catch" a bullet. Ballistic PMCs commonly contain fibers of 80 or more percent by volume, and contain relatively little polymeric matrix material (e.g., resin binder), for instance on the order of 15 percent by volume.

According to frequent inventive practice of infiltrative embodiments, the elastomeric coating 10/30 at least substantially infiltrates the first ply 29; that is, infiltration region 21 or 23 extends through approximately the entire width of the front-most ply 29. In exemplary inventive practice, a low amount of a resinous constituent in conjunction with a ballistic fibrous constituent in a ballistic-fabric-based material 200 may allow an elastomeric material 100 to penetrate, to a significant degree, into the underlying substrate, viz., the ballistic-fabric-based material 200, thereby forming a more rigid top surface of the elastomeric coating. Ballistic-fabric-based material 200 is characterized by plies (layers) 29 and a minimal resin content of 14 to 20 percent, by way of example. The low resin content may permit infusion of elastomeric material 100 into at least the first ply 29 of a ballistic-fabric-based material 200.

Figure 12:
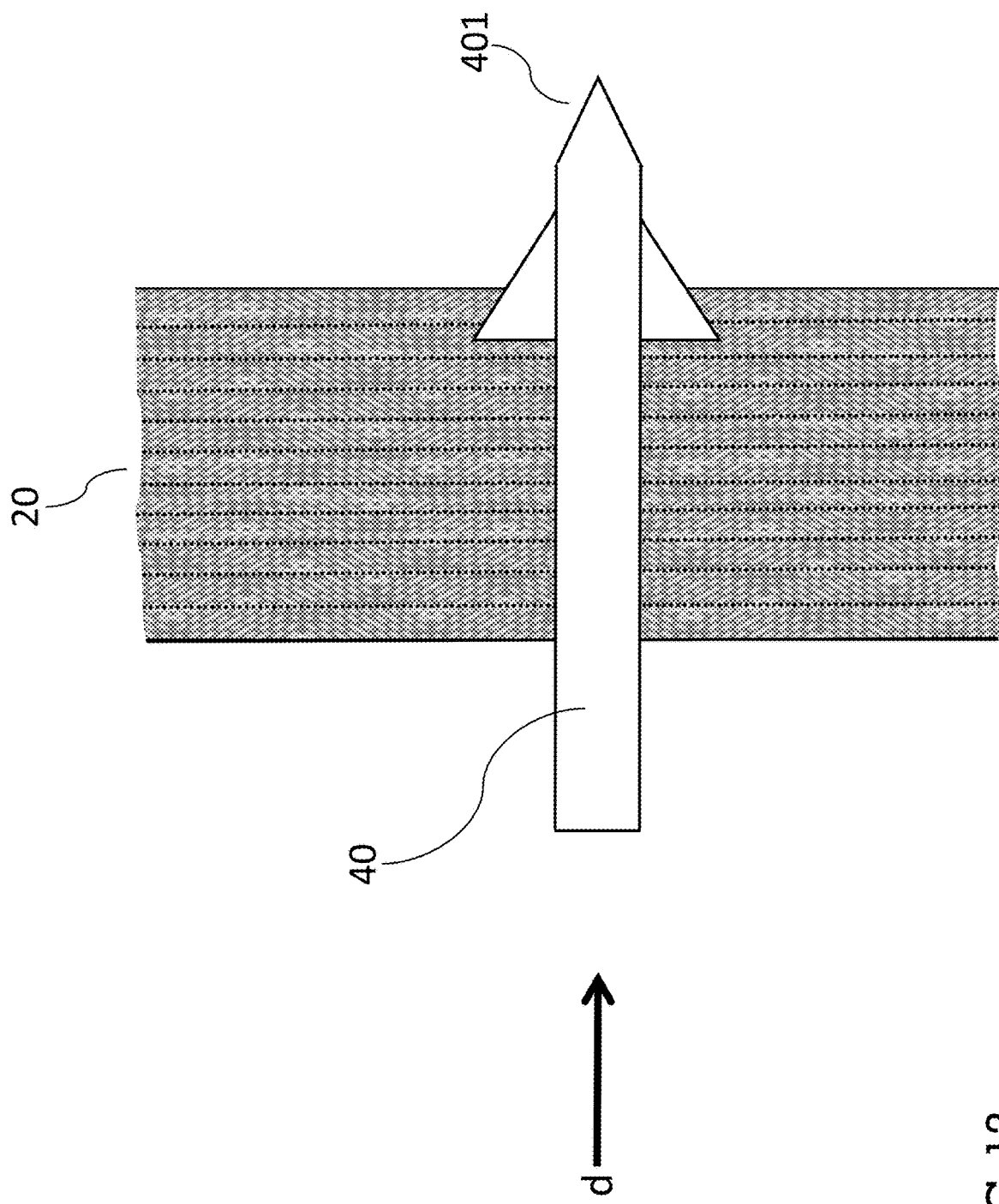
FIG. 12 is a diagram illustrating, by way of example of conventional ballistic armor, an intact penetration of an impelled broadhead arrow through a ballistic fabric.

With reference to FIGS. 9 through 16, according to exemplary practice of the present invention an elastomeric coating 10/30 forms an integral shell that resists penetration by sharp and pointed objects. Depending on the inventive embodiment, the elastomeric coating can be an unfilled elastomeric (e.g., polyurea) coating 10 (such as shown in FIGS. 1, 2, 5, and 6) or a particle-filled elastomeric (e.g., polyurea) matrix coating 30 (such as shown in FIGS. 3, 4, 7, and 8). FIGS. 12 through 16 each illustrate an example of an impelled arrow 40 impacting an armor system. FIG. 12 shows an example of interaction of an arrow 40 with a conventional ballistic armor system. FIGS. 13 through 16 each show an example of interaction of an arrow 40 with an inventive ballistic armor system.

As distinguished from an exemplary inventive ballistic armor system, a conventional ballistic armor system includes a ballistic fabric material 20 and does not include any strain-rate-sensitivity-hardening elastomeric material. As shown by way of example in FIG. 12, impelled arrow 40 moving in direction d transpierces a conventional ballistic fabric armor 20. Arrowhead 401, or a substantial portion thereof, penetrates completely through conventional fabric armor 20 and is manifestly injurious to the individual who is wearing the conventional fabric armor 20.

Figure 13:
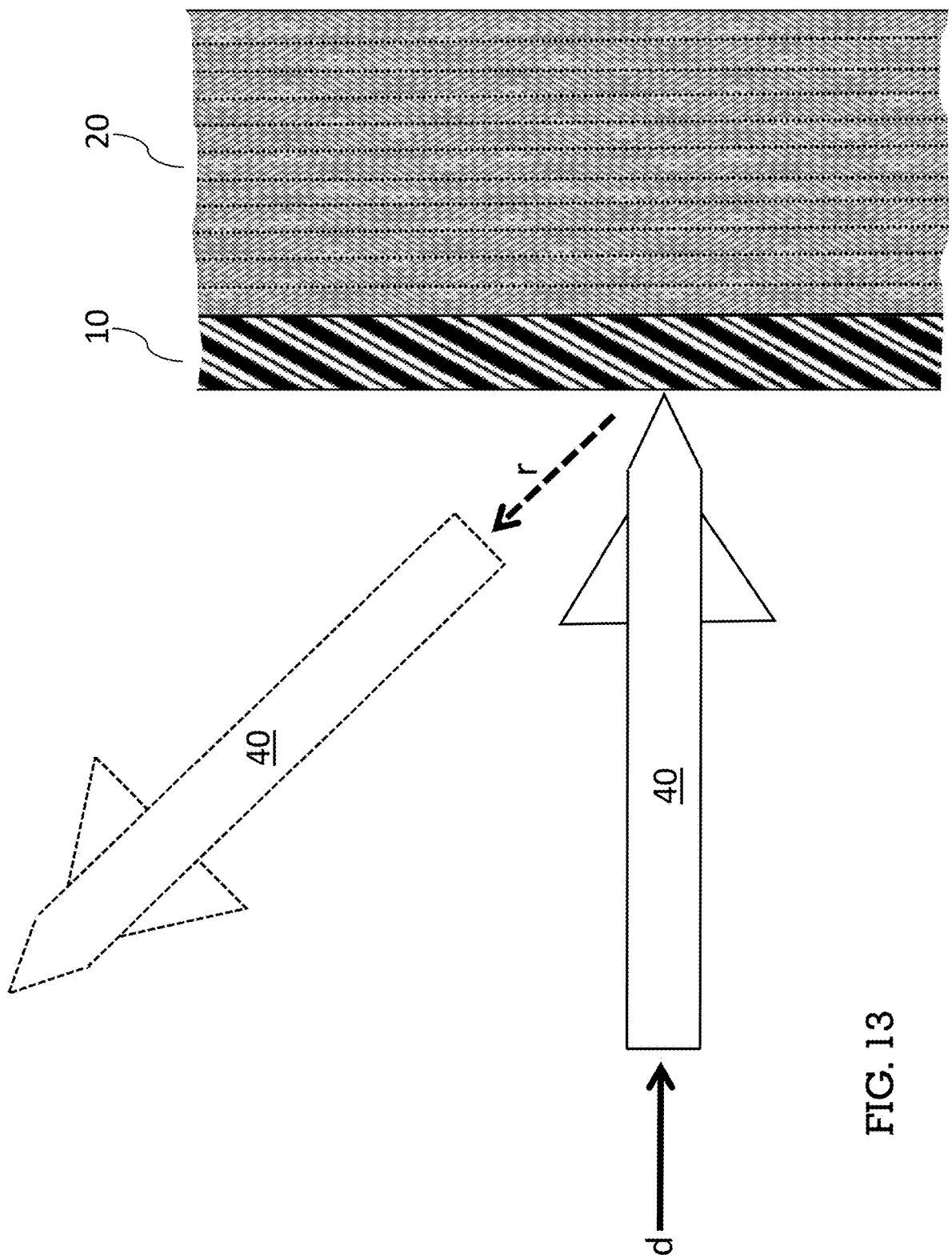
FIG. 13 is a diagram illustrating, by way of example of an inventive ballistic armor, a ricochet of an impelled broadhead arrow off of a strain-rate-sensitivity-hardening elastomer coating coupled with ballistic fabric.
Figure 14:
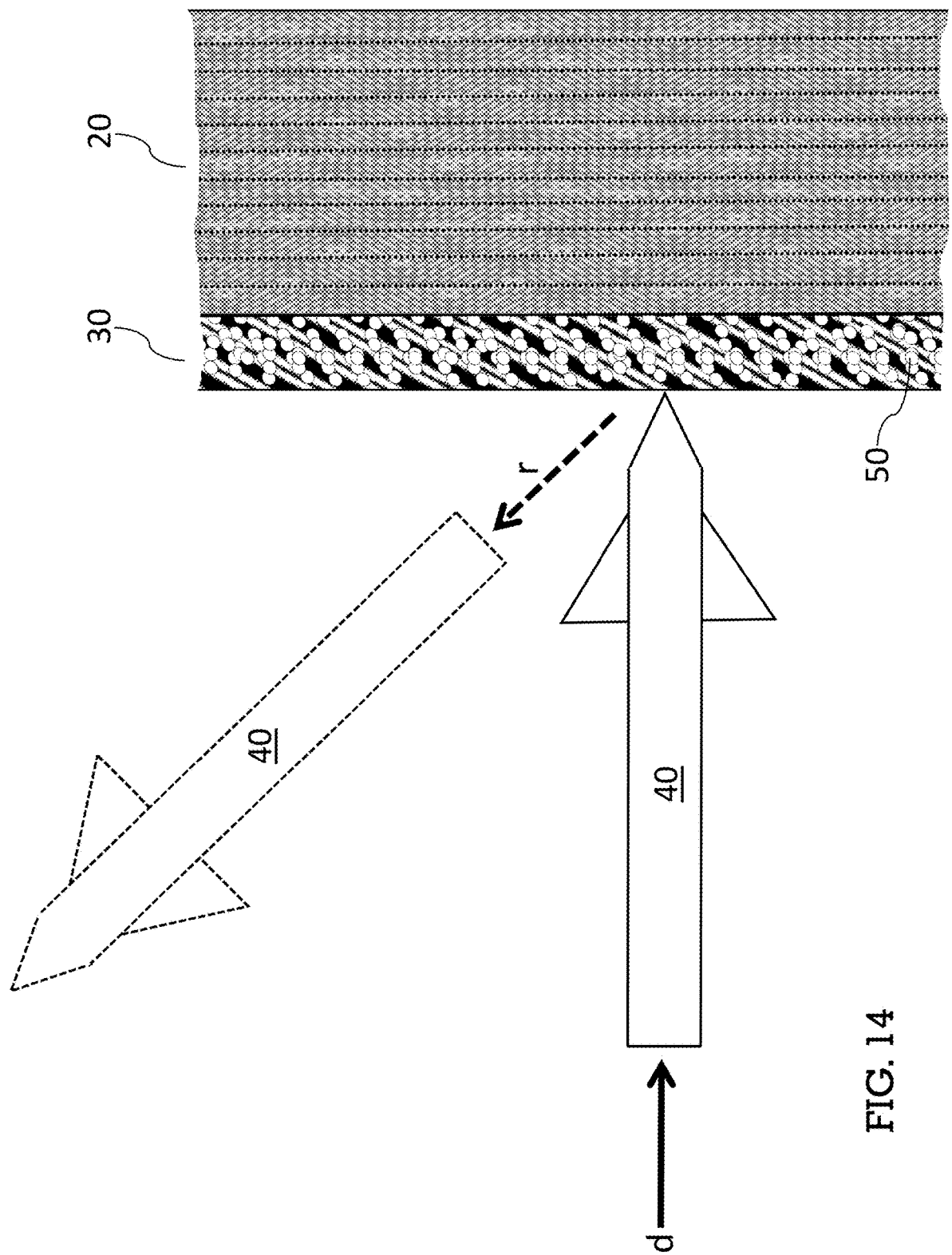
FIG. 14 is a diagram illustrating, by way of example of an inventive ballistic armor, a ricochet of an impelled broadhead arrow off of a particle-filled strain-rate-sensitivity-hardening elastomeric matrix material coupled with ballistic fabric.
Figure 15:
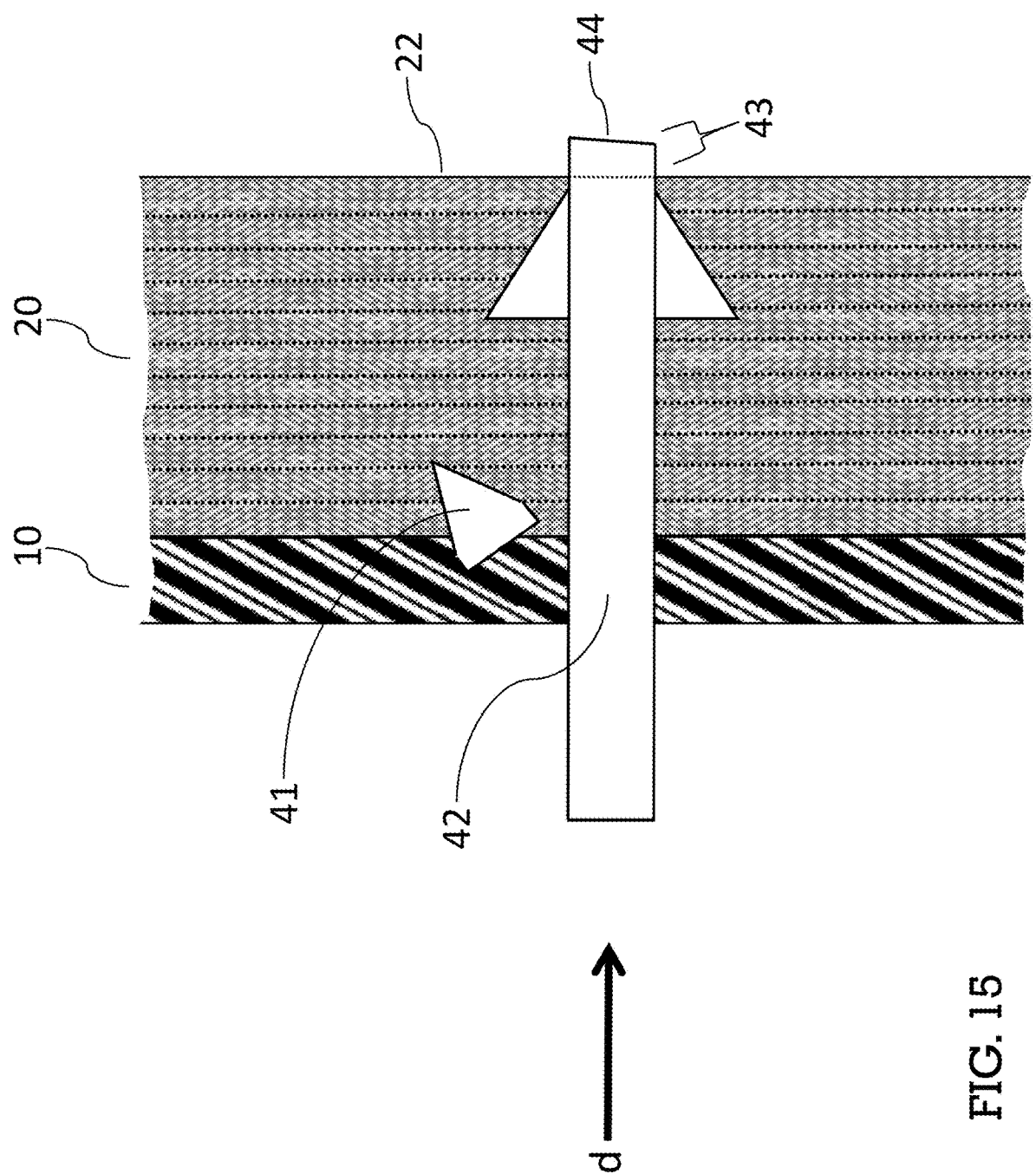
FIG. 15 is a diagram illustrating, by way of example of an inventive ballistic armor, a broken penetration of an impelled broadhead through a strain-rate-sensitivity-hardening elastomer coating coupled with ballistic fabric.
Figure 16:
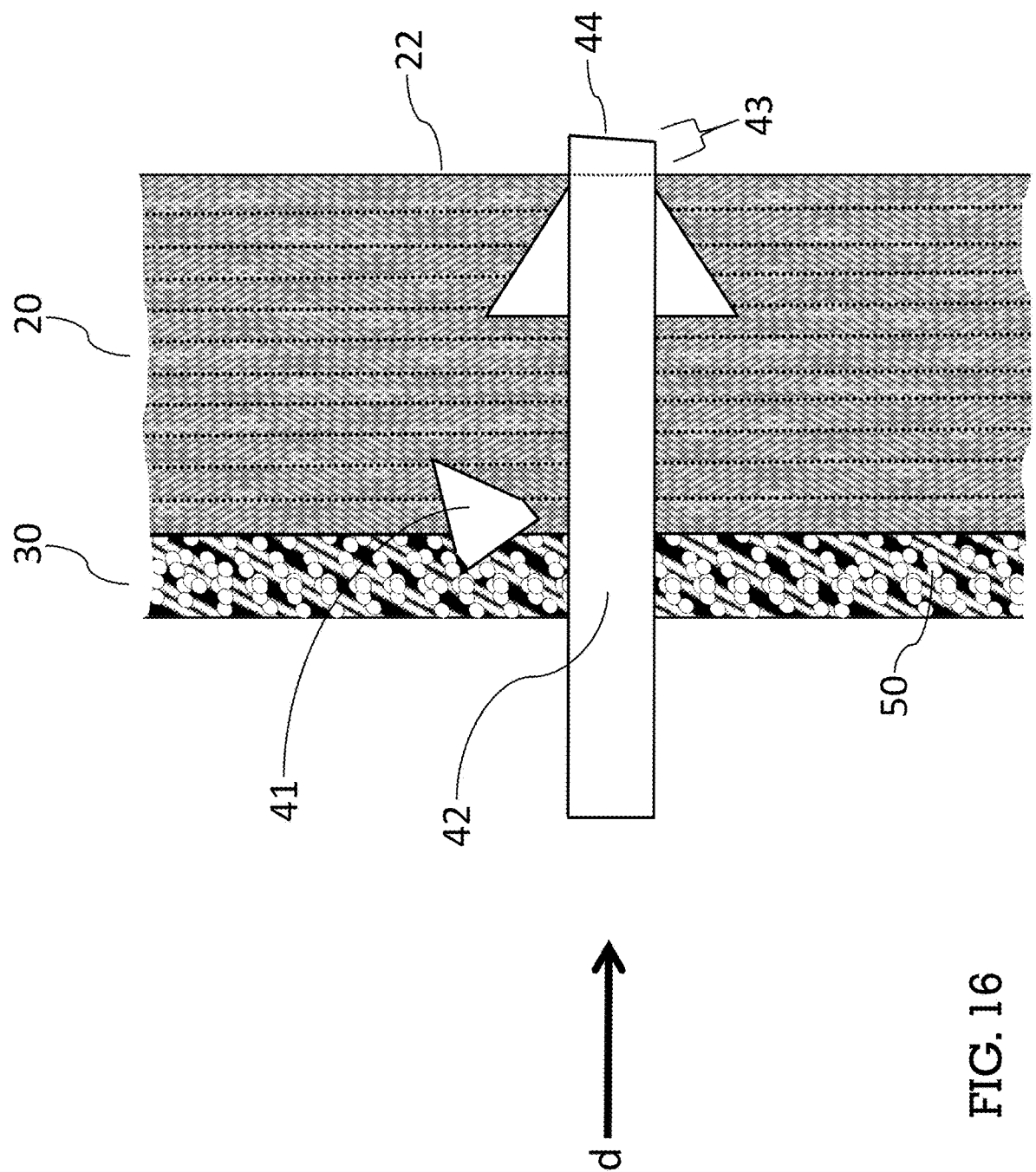
FIG. 16 is a diagram illustrating, by way of example of an inventive ballistic armor, a broken penetration of an impelled broadhead through a particle-filled strain-rate-sensitivity-hardening elastomeric matrix material coupled with ballistic fabric.

Unlike a conventional ballistic fabric armor, an exemplary inventive armor is capable of resisting both bullets and arrows. FIGS. 13 and 15 each depict impingement of an arrow 40 upon an inventive armor embodiment having an unfilled strain-rate-sensitivity-hardening elastomer coating 10. FIGS. 14 and 16 each depict impingement of an arrow 40 upon an inventive armor embodiment having a particle-filled strain-rate-sensitivity-hardening elastomeric matrix material coating 30. In contrast to conventional ballistic fabric armor systems, an exemplary inventive armor system includes not only a ballistic fabric material 20 but also includes, associated therewith, a strain-rate-sensitivity-hardening elastomeric material 10 or 30.

The present invention's ballistic fabric component 20 is capable of defeating ballistic threats. In addition, the present invention's elastomeric coating component 10, situated on a ballistic fabric 20, is capable of defeating pointed, sharp-cutting projectiles, such as the types of broadhead arrows that are portrayed by way of example in FIGS. 9 through 11. The present invention's elastomeric coating is thick enough to impede a broadhead arrow, and yet is thin enough to promote wearability as well as noninterference with the ballistic-protective mechanism of the fabric-based component.

An inventive armor system may resist sharp or pointed weaponry in any of various ways. FIGS. 13 through 16 exemplify possible dynamics of how an inventive armor may resist sharp or pointed weaponry. These examples portray "non-infiltrative" inventive embodiments, that is, inventive embodiments in which the elastomeric coating does not infiltrate to any extent into the fabric component. In the light of the instant disclosure, the ordinarily skilled artisan will appreciate that the inventive principles demonstrated in FIGS. 13 through 16 will similarly apply to "infiltrative" inventive embodiments, that is, inventive embodiments in which the elastomeric coating does to some extent infiltrate into the fabric component.

As depicted by way of example in FIGS. 13 and 14, respectively, upon impact with an inventive armor, a broadhead arrow traveling in initial direction d may ricochet (e.g., rebound or bounce) off a strain-rate-sensitivity-hardening elastomeric material coating 10/30, thus travelling divergently away from the inventive armor in a ricochet direction r. As another example, an elastomeric coating 10/30 may resist penetration in a manner resulting in breakoff of a tip portion 41 of an arrowhead 401, such as depicted by way of example in FIGS. 15 and 16, respectively.

As shown in FIGS. 15 and 16, tip portion 41 breaks off of arrowhead 401 while arrow 40 continues to traverse the inventive armor. Tip portion 41 remains immovably captured within the elastomeric coating 10/30 and/or the ballistic fabric 20, while the intact portion of arrow 40 continues to travel approximately in direction d. Only a small portion of arrowhead 401 pierces completely through the inventive armor, viz., transpierce portion 43, which inwardly projects from the inside surface of ballistic fabric 20 and has a front breakoff edge 44. Under many circumstances transpierce portion will protrude inwardly without significant personal injury, particularly if the wearer is also wearing padding or other material beneath the inventive armor.

Accordingly, as diagrammatically illustrated in FIGS. 15 and 16, the hard surface afforded by the elastomeric coating 10/30 enables the underlying ballistic fabric material 20 to resist the degraded arrowhead or any follow-on bullets or blast fragments such as from a warfighter scenario. Arrow 40 may experience (i) reduced velocity and/or (ii) tip breakage, due to a strain-rate-sensitivity-hardening of the elastomeric coating that is associated with the impact. The broken piece(s) of the arrow tip become(s) lodged in the ballistic fabric-based component. The major portion of the arrow tip continues to travel through the ballistic fabric-based component at a reduced rate, but does not penetrate as far as it would have if the arrow tip were speedier and entirely intact. The blunted arrow tip that remains after impact with the elastomeric coating does not proceed as far through the ballistic fabric-based component, as compared with what would occur upon encounter of the same arrow, at the same speed, with the ballistic fabric-based component in the absence of the elastomeric coating.

Also referring to FIGS. 17 and 18, inventive testing was conducted with respect to inventive armor embodiments that included a ballistic fabric-based component 20 up to 0.4 inch thick. The experimental results indicate that a very lightweight nominal elastomeric coating of approximately 1/16 through 0.1 in on Kevlar® parts can afford, to lightweight tactical armor such as found in body armor and different helmet types, a significant protective quality against sharp-edged point projectiles. FIG. 17 conveys that inventive practice admits of multifarious combinations of the respective thicknesses of the elastomeric coating thickness and the fabric-based component. As frequently practiced the present invention provides for a thickness ratio in the approximate range between 0.15 and 0.35.

Inventive performance was investigated with respect to ballistic fabric-based components categorized in two discrete ranges of the pounds per square foot pressure unit (psf). The present inventors demonstrated the effectiveness of an embodiment of an inventive armor system that included a ballistic fabric-based component 20 construction on the order of 1.8 to 2.3 psf in combination with a polyurea coating 10 on the order of 0.08 to 0.10 inch thick. Further, the present inventors demonstrated the effectiveness of an embodiment of an inventive armor system that included a lighter ballistic fabric-based component 20 construction, viz., on the order of 1.3 to 1.7 psf, in combination with a polyurea matrix coating 30 on the order of 0.08 to 0.10 inch thick.

The experiments that were undertaken by the present inventors involved two types of leftover panels from a Cooperative Research and Development Agreement (CRADA) program in which the U.S. Navy and DuPont Corporation collaborated to investigate helmet technology. The panel of the first type represented a light advanced Kevlar® helmet architecture (about 2.0 psf). The panel of the second type represented a very light Kevlar® construction (about 1.5 psf). It is noted that standard combat helmets currently used by the military have an areal density of about 2.2 psf. Razor-sharp broadhead arrows were used by the present inventors to test the efficacy of inventive practice, in particular the effects of inventive elastomeric coatings 10/30 in stopping penetration of the broadhead arrows. The arrows were launched at 25 yards with 55 lb of pull. The arrow used in the testing was a 100 grain broadhead with a 28¼ inch shaft.

In the testing of the panel of the first type, half of the panel was coated with a thin, nominally 1/16 inch coating of polyurea. This polyurea coating was an unfilled strain-rate-sensitivity-hardening elastomer coating. As illustrated by way of example in FIG. 12, the penetration of the arrows into the uncoated half of the Kevlar® panel was sufficient to pierce into the skull of a human wearing a helmet corresponding to the uncoated half of the panel. In contrast, the arrows just bounced off the polyurea-coated half of the panel, such as illustrated by way of example in FIG. 13.

In the testing of the panel of the second type, a particle-filled strain-rate-sensitivity-hardening elastomeric matrix coating was added to the panel to reach approximately a 2.0 psf level. The polyuria matrix coating on the second panel, exemplified in FIG. 16, was a polyurea filled with small glass microspheres constituting nominally 30 percent (weight percentage) of the overall weight of the elastomeric coating. The second panel's polyurea matrix coating 30 was produced by adding glass particulates 50 to a polyurea material constituent 10. The glass particulates 50 were each up to 100 microns in diameter and overall constituted up to 30 percent by weight of the polyurea matrix coating 30.

As illustrated by way of example in FIG. 16, arrows were able to pierce through the particle-filled polyuria matrix coating and the very light Kevlar® material "backing." However, the penetration level of each of the arrows was small, the projection distance less than the typical thickness of the pads between the helmet shell and human skull in typical use of a conventional combat helmet. The tip of the most deeply penetrating arrow was actually broken off while the arrow was passing through the elastomeric coating.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A composite armor system comprising:
   a ballistic fabric-based backing layer, said ballistic fabric-based backing layer having an areal density no greater than approximately 1.7 pounds per square foot; and
   an elastomeric coating strike-face layer, said elastomeric coating strike-face layer consisting essentially of a particle-filled strain-rate-sensitivity-hardening elastomeric matrix material and covering at least one area of said ballistic fabric-based backing layer, said particle-filled strain-rate-sensitivity-hardening elastomeric matrix material having a combination of an elastomer matrix and a quantity of particles in said elastomer matrix, said quantity of particles by weight constituting no greater than approximately 50 percent of the weight of said elastomer matrix;
   wherein in said at least one area of said ballistic fabric-based backing layer:
      said elastomeric coating strike-face layer is bonded onto said ballistic fabric-based backing layer;
      said elastomeric coating strike-face layer does not infiltrate into said ballistic-fabric-based backing layer;
      said elastomeric coating strike-face layer and said ballistic fabric-based backing layer, in combination, have an areal density no greater than approximately 2.5 pounds per square foot;
      said elastomeric coating strike-face layer has a thickness no less than 0.06 inch;
   wherein, upon impact by a sharp or pointed object, said elastomeric coating strike-face layer undergoes strain-rate-sensitivity hardening that impedes said sharp or pointed object.

2. The composite armor system of claim 1, wherein in said at least one area said ballistic fabric-based backing layer has an areal density in the approximate range of 1.3 to 1.7 pounds per square foot.

3. The composite armor system of claim 1, wherein in said at least one area said quantity of particles constitutes a weight in the approximate range of 10 percent to 30 percent of the weight of said elastomer matrix.

4. The composite armor system of claim 1, wherein in said at least one area:
   said elastomeric coating strike-face layer has a thickness in the approximate range of 0.06 to 0.12 inch; and
   said ballistic fabric-based backing layer has a thickness in the approximate range of 0.2 to 0.5 inch.

5. The composite armor system of claim 1, wherein in said at least one area:
   said elastomeric coating strike-face layer has a thickness in the approximate range of 0.08 to 0.10 inch; and
   said ballistic fabric-based backing layer has a thickness in the approximate range of 0.2 to 0.5 inch.

6. The composite armor system of claim 1, wherein said elastomer matrix is a polyurea.

7. The composite armor system of claim 1, wherein:
   said elastomer matrix is selected from the group of elastomers consisting of polyurea, polyurethane, and a mixture of polyurea and polyurethane;
   said ballistic fabric-based backing layer includes a fabric material selected from the group of fabric materials consisting of aramid, polyethylene, polyamide, polyester, polybenzobisoxazole, and glass.

8. The composite armor system of claim 1, wherein:
   said elastomer matrix is selected from the group of elastomers consisting of polyurea, polyurethane, and a mixture of polyurea and polyurethane;
   said ballistic fabric-based backing layer includes a fabric material selected from the group of fabric materials consisting of aramid, polyethylene, polyamide, polyester, polybenzobisoxazole, and glass;

in said at least one area of said ballistic fabric-based backing layer:
  said elastomeric coating layer has a thickness no less than 0.06 inch;
  said ballistic fabric-based backing layer has a thickness no less than 0.2 inch;
  the ratio of said thickness of said elastomeric coating layer to said thickness of said ballistic fabric-based backing layer is no less than 0.12.

9. A composite armor system comprising:
a ballistic fabric-based backing layer, said ballistic fabric-based backing layer having an areal density no greater than approximately 1.7 pounds per square foot; and
an elastomeric coating strike-face layer, said elastomeric coating layer consisting essentially of a particle-filled strain-rate-sensitivity-hardening elastomeric matrix material, said elastomeric coating layer covering at least one area of said ballistic fabric-based backing layer, said particle-filled strain-rate-sensitivity-hardening elastomeric matrix material having a combination of an elastomer matrix and a quantity of particles in said elastomer matrix, said quantity of particles by weight constituting no greater than approximately 50 percent of the weight of said elastomer matrix;
wherein in said at least one area of said ballistic fabric-based backing layer:
  said elastomeric coating strike-face layer is bonded onto said ballistic fabric-based backing layer;
  a portion of said elastomeric coating strike-face layer infiltrates said ballistic fabric-based backing layer;
  an infiltration region is formed representing both a sublayer of said elastomeric coating strike-face layer and a sublayer of said ballistic-fabric-based backing layer;
  said infiltration region has a thickness in the approximate range of 10 to 60 percent of the thickness of said ballistic fabric-based backing layer;
  said elastomeric coating strike-face layer and said ballistic fabric-based backing layer, in combination, have an areal density no greater than approximately 2.5 pounds per square foot;
  said ballistic fabric-based backing layer has a plurality of plies, said plurality of plies including a front-most ply;
  said infiltration region extends through approximately the entire said front-most ply;
wherein, upon impact by a sharp or pointed object, said elastomeric coating strike-face layer undergoes strain-rate-sensitivity hardening that impedes said sharp or pointed object.

10. The composite armor system of claim 1, wherein in said at least one area of said ballistic fabric-based backing layer the ratio of said thickness of said elastomeric coating strike-face layer to said thickness of said ballistic fabric-based backing layer is in the approximate range of 0.15 to 0.35.

11. The composite armor system of claim 9, wherein in said at least one area:
  said elastomeric coating strike-face layer has a thickness in the approximate range of 0.06 to 0.12 inch; and
  said ballistic fabric-based backing layer has a thickness in the approximate range of 0.2 to 0.5 inch.

12. The composite armor system of claim 9, wherein in said at least one area:
  said elastomeric coating strike-face layer has a thickness in the approximate range of 0.08 to 0.10 inch; and
  said ballistic fabric-based backing layer has a thickness in the approximate range of 0.2 to 0.5 inch.

13. The composite armor system of claim 9, wherein said elastomeric matrix material is a polyurea.

14. The composite armor system of claim 9, wherein:
said elastomeric coating strike-face layer is selected from the group of elastomeric materials consisting of polyurea, polyurethane, and a mixture of polyurea and polyurethane;
said ballistic fabric-based backing layer includes a fabric material selected from the group of fabric materials consisting of aramid, polyethylene, polyamide, polyester, polybenzobisoxazole, and glass.

* * * * *